US012732357B2

United States Patent

Saxena et al.

(10) Patent No.: US 12,732,357 B2
(45) Date of Patent: Sep. 8, 2026

(54) SYSTEM AND METHOD SUPPORTING DATA RESIDENCY REQUIREMENT IN CLOUD HOSTED HARDWARE SECURITY MODULES

(71) Applicant: THALES DIS CPL USA, INC., Austin, TX (US)

(72) Inventors: Prateek Saxena, Noida (IN); Danish Parvez, New Delhi (IN); Shivam Garg, Noida (IN)

(73) Assignee: THALES DIS CPL USA, INC., Austin, TX (US)

( * ) Notice: Subject to any disclaimer, the term of this patent is extended or adjusted under 35 U.S.C. 154(b) by 0 days.

(21) Appl. No.: 19/113,482

(22) PCT Filed: Sep. 20, 2023

(86) PCT No.: PCT/US2023/033197

§ 371 (c)(1), (2) Date: Mar. 20, 2025

(87) PCT Pub. No.: WO2024/064177

PCT Pub. Date: Mar. 28, 2024

(65) Prior Publication Data

US 2026/0005849 A1 Jan. 1, 2026

(30) Foreign Application Priority Data

Sep. 20, 2022 (EP) .................................... 22196695

(51) Int. Cl.
*H04L 9/08* (2006.01)
*G06F 21/62* (2013.01)
(Continued)

(52) U.S. Cl.
CPC ........ *H04L 9/0872* (2013.01); *G06F 21/6218* (2013.01); *H04L 9/0877* (2013.01);
(Continued)

(58) Field of Classification Search
None
See application file for complete search history.

(56) References Cited

U.S. PATENT DOCUMENTS 5,506,986 A * 4/1996 Healy .................. G06F 3/0601 711/111
5,659,743 A * 8/1997 Adams ................. G06F 12/121 711/E12.07

(Continued)

OTHER PUBLICATIONS

Cho et al "LAAC: A Location-Aware Access Control Protocol," IEEE, pp. 1-7 (Year: 2006).*

(Continued)

*Primary Examiner* — Luu T Pham
*Assistant Examiner* — James J Wilcox

(57) ABSTRACT

Provides is a system and method supportive of data residency requirements that includes a Hardware Security Module (HSM) hosted on a cloud environment and a location tracker embedded within or directly connected to the HSM to provide an HSM location, the HSM including one or more processors and memory including computer instructions causing the one or more processors to perform certain operations. The operations can include receiving a request for access to information over a network and obtaining authorized location information where the HSM is authorized to process the request from a source of the request for access, comparing the HSM location with the authorized location information from the source, processing the request for access if the HSM location is within the authorized location information and rejecting the request if the HSM location is not within the authorized location information. Other embodiments disclosed.

12 Claims, 9 Drawing Sheets

(51) Int. Cl.
*H04L 9/32* (2006.01)
*H04L 9/40* (2022.01)
*H04L 67/52* (2022.01)
*H04W 4/029* (2018.01)
*G06F 21/44* (2013.01)

(52) U.S. Cl.
CPC ............ *H04L 9/088* (2013.01); *H04L 9/3247* (2013.01); *H04L 9/3265* (2013.01); *H04L 63/107* (2013.01); *H04L 67/52* (2022.05); *H04W 4/029* (2018.02); *G06F 21/44* (2013.01); *G06F 2221/2111* (2013.01)

(56) References Cited

U.S. PATENT DOCUMENTS 5,822,780 A * 10/1998 Schutzman ......... G06F 16/9017 707/E17.037
8,491,488 B1 * 7/2013 Criley .................... A61B 7/003 600/528
9,477,603 B2 * 10/2016 Waldspurger ....... G06F 12/0895
9,608,810 B1 * 3/2017 Ghetti ................ H04L 63/0428
9,723,039 B2 * 8/2017 DeLuca ................ H04W 4/029
9,767,689 B1 * 9/2017 Cain .................... G08G 1/0133
9,900,287 B1 * 2/2018 Jooste ....................... H04L 9/14
9,946,906 B2 * 4/2018 Ricci ....................... B60L 53/65
9,963,106 B1 * 5/2018 Ricci ..................... B60R 25/305
9,984,572 B1 * 5/2018 Newman .......... G08G 1/096758
10,031,521 B1 * 7/2018 Newman ........... B60H 1/00771
10,074,223 B2 * 9/2018 Newman ........... G07C 9/00309
10,234,302 B2 * 3/2019 Singhal ................ G08G 1/0129
10,286,915 B2 * 5/2019 Xiao ............... B60W 30/18154
10,348,706 B2 * 7/2019 Brickell ............... H04L 9/0872
10,369,966 B1 * 8/2019 Higgins ............ G07C 9/00571
10,373,158 B1 * 8/2019 James .................... G06Q 40/04
10,404,830 B2 * 9/2019 Zhang ..................... H04L 67/63
10,410,250 B2 * 9/2019 Singhal ............. G01C 21/3407
10,471,829 B2 * 11/2019 Yellambalase ........ B60L 3/0046
10,540,654 B1 * 1/2020 James ................. G06Q 20/223
10,606,274 B2 * 3/2020 Yalla ...................... G01C 21/30
10,614,241 B1 * 4/2020 Kirby ...................... G06F 16/13
10,635,109 B2 * 4/2020 Guo .................... B60W 50/029
10,644,890 B1 * 5/2020 Peddada ............... H04L 9/0894
10,749,689 B1 * 8/2020 Peddada ............... H04L 9/0894
10,897,469 B2 * 1/2021 Hirshberg .............. G06F 21/85
10,935,978 B2 * 3/2021 Yalla .................. G01C 21/3407
10,979,217 B1 * 4/2021 West ..................... H04L 9/0819
11,200,564 B2 * 12/2021 Fay ..................... G06Q 20/363
11,200,569 B1 * 12/2021 James ................. G06Q 20/381
11,240,023 B1 * 2/2022 Donlan ................... H04L 9/088
11,246,032 B1 * 2/2022 Maass ................... H04L 9/0861
11,308,487 B1 * 4/2022 Foster ................. G06Q 20/065
11,323,513 B1 * 5/2022 Vibhor ................. G06F 16/178
11,334,883 B1 * 5/2022 Auerbach ............ G06Q 20/223
11,405,786 B1 * 8/2022 Monteuuis .......... H04W 12/122
11,430,434 B1 * 8/2022 Milstein .................. G10L 15/08
11,501,370 B1 * 11/2022 Paya ..................... H04L 9/0819
12,093,942 B1 * 9/2024 Auerbach .......... G06Q 20/3829
12,141,871 B1 * 11/2024 James ................. G06Q 20/065
12,192,183 B1 * 1/2025 Kerr ........................ H04L 12/66
12,265,953 B1 * 4/2025 Harrison ............... H04L 9/0825
12,271,898 B1 * 4/2025 Arvanaghi ............. G06Q 20/10
2002/0053009 A1 * 5/2002 Selkirk ................... G06F 3/065 711/114
2002/0087544 A1 * 7/2002 Selkirk ................... G06F 3/067
2002/0152490 A1 * 10/2002 Lake .................... C12N 5/0697 800/17
2002/0178335 A1 * 11/2002 Selkirk ................. G06F 3/0631 711/202
2003/0005248 A1 * 1/2003 Selkirk ................... G06F 3/067 711/114
2004/0225659 A1 * 11/2004 O'Brien .............. G06F 16/1824 707/999.009
2006/0166679 A1 * 7/2006 Karaoguz ............... H04L 67/52 455/456.1
2007/0033340 A1 * 2/2007 Tulskie ................. G06F 3/0605 711/108
2008/0189214 A1 * 8/2008 Mueller ................. G06Q 20/20 705/72
2009/0125884 A1 * 5/2009 Hsu ........................ G06Q 10/06 717/127
2009/0132813 A1 * 5/2009 Schibuk ............. G06Q 20/4014 726/9
2009/0149200 A1 * 6/2009 Jayasinghe ........... H04W 4/029 455/456.3
2009/0265552 A1 * 10/2009 Moshir .................. H04W 4/12 713/168
2011/0276753 A1 * 11/2011 Peake ................... G06F 3/0659 711/111
2011/0276754 A1 * 11/2011 Bish ........................ G06F 3/065 711/111
2011/0276756 A1 * 11/2011 Bish ...................... G06F 3/0614 711/111
2012/0102334 A1 * 4/2012 O'Loughlin .......... H04L 9/3252 713/189
2012/0131354 A1 * 5/2012 French .................. H04L 9/3213 713/189
2012/0179909 A1 * 7/2012 Sagi ...................... H04L 9/0872 713/167
2013/0179676 A1 * 7/2013 Hamid .................. G06F 21/335 713/150
2013/0254117 A1 * 9/2013 Von Mueller ...... G06Q 20/3829 705/71
2014/0096182 A1 * 4/2014 Smith ................. H04L 63/0853 726/1
2014/0164776 A1 * 6/2014 Hook .................. G06F 21/6218 713/171
2014/0201144 A1 * 7/2014 Vibhor .................. G06F 16/178 707/634
2014/0330817 A1 * 11/2014 Eleftheriou ........... G06F 3/0659 707/722
2015/0254912 A1 * 9/2015 Weisman ............. H04L 9/0866 705/325
2015/0271154 A1 * 9/2015 Ronca ................... H04L 63/062 713/168
2016/0011318 A1 * 1/2016 Cohen ..................... G01S 19/05 342/357.68
2016/0036558 A1 * 2/2016 Ibrahim .................. H04W 4/44 455/297
2016/0041758 A1 * 2/2016 Iwasaki ................. G06F 3/0689 711/103
2016/0065589 A1 * 3/2016 Leighton ............... H04L 63/123 726/4
2016/0092243 A1 3/2016 Boenisch et al.
2016/0094674 A1 * 3/2016 Drion ................. H04B 7/18506 709/217
2016/0142482 A1 * 5/2016 Mehta ................. H04L 67/1097 709/203
2016/0247144 A1 * 8/2016 Oh ......................... G06K 7/083
2016/0253651 A1 * 9/2016 Park ....................... G06Q 20/34 705/39
2016/0253652 A1 * 9/2016 Je ..................... G06Q 20/38215 705/39
2016/0253669 A1 * 9/2016 Yoon .................... G06Q 20/327 705/75
2016/0253670 A1 * 9/2016 Kim ................. G06Q 20/38215 705/72
2016/0277368 A1 * 9/2016 Narayanaswamy .. H04L 9/3236
2016/0353241 A1 * 12/2016 Venkataramani ..... H04L 49/109
2017/0004665 A1 * 1/2017 Chang ................ G07C 9/00309
2017/0017937 A1 * 1/2017 Lim ..................... G06Q 20/327
2017/0026345 A1 * 1/2017 Salek .................. H04W 12/033
2017/0054204 A1 * 2/2017 Changalvala ............ H01Q 1/42
2017/0083882 A1 * 3/2017 Kim ..................... G06Q 20/102
2017/0126636 A1 * 5/2017 Lor ......................... H04L 63/08
2017/0126698 A1 * 5/2017 Minkovich ............. G06F 21/00
2017/0155662 A1 * 6/2017 Courbon ............... H04L 63/107
2017/0222990 A1 * 8/2017 Romansky ............ H04L 9/3268
2017/0250972 A1 * 8/2017 Ronda ................... H04L 9/0891
2017/0262185 A1 * 9/2017 Long ..................... G06F 3/0667
2017/0329016 A1 * 11/2017 Cruddace .............. G01S 19/071

(56) References Cited

U.S. PATENT DOCUMENTS

2017/0337542 A1* 11/2017 Kim .................... G06Q 20/386
2017/0366558 A1* 12/2017 Liu ...................... H04L 63/101
2018/0033013 A1* 2/2018 Park .................. G06Q 20/4097
2018/0034631 A1* 2/2018 Ries ....................... G01S 19/14
2018/0106907 A1* 4/2018 Staehlin .............. H04B 1/3822
2018/0227311 A1* 8/2018 Hippelainen ......... H04L 9/0877
2018/0317266 A1* 11/2018 Britt ....................... H04W 4/80
2019/0012745 A1* 1/2019 Ampe ................... G06Q 10/10
2019/0118767 A1* 4/2019 Britt ..................... H04L 67/125
2019/0139032 A1* 5/2019 Heavey ................. G06Q 30/08
2019/0182157 A1* 6/2019 Barnes ............... H04L 63/0407
2019/0207995 A1* 7/2019 Gonzales, Jr. ....... G06Q 20/389
2019/0296426 A1* 9/2019 Sohn ....................... H01Q 5/50
2019/0332764 A1* 10/2019 Jeon ...................... H04N 23/20
2019/0349204 A1* 11/2019 Enke ..................... G06F 21/602
2019/0349426 A1* 11/2019 Smith .................. H04L 63/123
2019/0394024 A1* 12/2019 Vepa .................. G06F 21/6209
2020/0153625 A1* 5/2020 Schaap ................ H04L 9/0869
2020/0186342 A1* 6/2020 Zhang .................. H04L 9/0872
2020/0274876 A1* 8/2020 Mathew ............. G06F 21/6218
2020/0311676 A1* 10/2020 Smith, Jr. .......... G06Q 10/0832
2020/0396220 A1* 12/2020 McKegney ......... H04L 63/0884
2020/0410113 A1* 12/2020 Gryb ...................... H04L 9/302
2021/0004803 A1* 1/2021 Rule ................... G06Q 20/352
2021/0056545 A1* 2/2021 McCauley ......... G06Q 20/3226
2021/0056844 A1* 2/2021 Park .................. G08G 1/09675
2021/0203657 A1* 7/2021 Huapaya .............. H04W 12/63
2021/0232704 A1* 7/2021 Lim ....................... B60R 25/00
2021/0272114 A1* 9/2021 Kita ................ G06Q 20/38215
2021/0336797 A1* 10/2021 Van Duren ........... H04L 9/0825
2021/0344485 A1* 11/2021 Levin .................... H04L 9/0825
2021/0345106 A1* 11/2021 Hatanaka .............. H04W 24/00
2021/0357927 A1* 11/2021 Kita ................ G06Q 20/38215
2021/0392142 A1* 12/2021 Stephens .............. H04L 63/104
2021/0400053 A1* 12/2021 Jacobson .............. H04L 9/3213
2021/0406920 A1* 12/2021 McLaney ......... G06Q 20/38215
2022/0051558 A1* 2/2022 Choi ................ G08G 1/096783
2022/0060957 A1* 2/2022 Shuman ................ H04W 88/06
2022/0084013 A1* 3/2022 Kulkarni ............ G06Q 20/3825
2022/0091759 A1* 3/2022 Kobayashi ............. G06F 3/067
2022/0094537 A1* 3/2022 Shimada ............... G06F 21/602
2022/0158852 A1* 5/2022 Brockhaus ............ H04L 9/0872
2022/0171648 A1* 6/2022 Rodriguez .......... G06F 9/45533
2022/0209940 A1* 6/2022 Woo ...................... H04L 9/3247
2022/0232024 A1* 7/2022 Kapoor .................. G06F 21/57
2022/0232025 A1* 7/2022 Kapoor ............... H04L 63/1425
2022/0248296 A1* 8/2022 Merwaday ............ H04W 48/18
2022/0253842 A1* 8/2022 James ....................... H04L 9/50
2022/0261487 A1* 8/2022 Lounsberry ......... G06F 21/6209
2022/0272084 A1* 8/2022 Hyatt .................... H04W 12/06
2022/0286294 A1* 9/2022 Grobler ................. H04L 9/3247
2022/0318389 A1* 10/2022 Naqvi ................... G06F 21/602
2022/0322094 A1* 10/2022 Maschue ............. H04W 12/106
2022/0345305 A1* 10/2022 Tollefson .............. H04L 9/0872
2022/0376931 A1* 11/2022 Simplicio, Jr. ......... H04L 67/12
2022/0394486 A1* 12/2022 Rodriguez Bravo . H04W 12/63
2023/0037318 A1* 2/2023 Foster .................. G05D 1/0027
2023/0060411 A1* 3/2023 Gluck .................. G08B 21/182
2023/0068609 A1* 3/2023 Donaldson .............. H04W 4/80
2023/0071375 A1* 3/2023 Li ............................. H04L 9/14
2023/0125588 A1* 4/2023 Savage ................. H04L 9/3226
713/175
2023/0231716 A1* 7/2023 Mitra .................... H04L 9/3213
2023/0308271 A1* 9/2023 Seaborn ................ H04L 9/0869
2023/0370286 A1* 11/2023 Palakonda .......... H04W 12/069
2023/0419744 A1* 12/2023 Kim .................... H04W 72/543
2024/0005296 A1* 1/2024 Stankoulov ........ G06Q 20/3224
2024/0056292 A1* 2/2024 Jeong .................... H04L 9/0861
2024/0143788 A1* 5/2024 Chen ....................... H04L 63/20
2024/0154798 A1* 5/2024 Friesen ................. H04L 9/0869
2024/0323657 A1* 9/2024 Yang ....................... H04W 4/40
2025/0015980 A1* 1/2025 Stapleton .............. H04L 9/0822
2025/0219828 A1* 7/2025 Augustyn ............. H04L 9/0894
2025/0286702 A1* 9/2025 Masunaga ................. H04L 9/16

OTHER PUBLICATIONS

Hansen et al "Spatial Role-Based Access Control for Wireless Networks," IEEE, pp. 2093-2097 (Year: 2003).*

Van Cleff et al Benefits of Location-Based Access Control: A Literature Study, IEEE Computer Society, pp. 739-746 (Year: 2010).*

Seol et al "A Trusted IaaS Environment with Hardware Security Module," IEEE, pp. 343-356 (Year: 2016).*

Firoozjaei et al "Implementing Geo-Encryption in GSM Cellular Network," IEEE, pp. 299-302 (Year: 2012).*

International Search Report (PCT/ISA/210) and Written Opinion (PCT/ISA/237) mailed on Nov. 17, 2023, by the European Patent Office as the International Searching Authority for current International Application No. PCT/US2023/033197—[12 pages].

* cited by examiner

SYSTEM AND METHOD SUPPORTING DATA RESIDENCY REQUIREMENT IN CLOUD HOSTED HARDWARE SECURITY MODULES

TECHNICAL FIELD

The present embodiments relate generally to management and configuration of network devices, and more particularly, to a Hardware Security Module (HSM) cryptographic unit for networked communications having a location tracker coupled thereto to support data residency requirements.

BACKGROUND

A Hardware Security Module (HSM) is a dedicated crypto processing unit that is specifically designed for the hardware protection of the cryptographic key lifecycle. HSMs act as trust anchors that protect the crypto infrastructure of some of the most security-conscious organizations in the world by securely managing, processing, and storing cryptographic keys inside a hardened, tamper-resistant device. Enterprises use hardware security modules to protect transactions, identities, and applications, as HSMs excel at securing cryptographic keys and provisioning encryption, decryption, authentication, and digital signing services for a wide range of applications.

HSM protect keys and are used by applications in on premise, virtual, and cloud environments. They are hardware appliances that can be stored in racks in a data center and associated with cryptographic networking components. They are deployed and securely configured remotely in any of these environments. Because they are secure and operate on sensitive data only authorized applications are allowed access. Access to a HSM is usually controlled via a management interface.

FIG. 1 illustrates an existing work flow for setting up an HSM in a protected environment using untrusted hardware. Here, as seen in the first step, when the lab operator receives a delivery of HSM units, the operator must rack and stack the HSM units within the highly secure lab environment. The operator then powers up and onboards the HSM units onto a network cluster to provide cloud services. This onboarding is the process of connecting a new unit, first to the network, then the Internet, then subsequently enabling services on the unit. A cluster is a collection of individual HSMs that a Cloud HSM service provider synchronizes and maintains such that an external user or customer considers the cluster as one logical HSM for their purposes. From the customer's perspective, when they sign up for HSM services, they commission and use the services of one generic HSM, where the company provisions the HSM according to their specifications. The customer is not responsible for allocation, delegation and maintenance of services amongst the multiple HSMs in the cluster. Generally, onboarding is performed by the company hosting the cluster of HSMs, and includes provisioning and configuring the units for use by a particular customer/user according to their preferences, one of which, is the unit's network configuration settings, such as an Internet Protocol (IP) address.

As seen in the second step, to configure the HSM network communication, the lab operator manually connects a serial cable from a workstation lap-top to the HSM to take control of it, and then manually configures the HSM IP address. The workstation lap-top is however an untrusted device, which may further include a keyboard, mouse, etc. In this existing approach, the HSM detects the serial connection and opens up a terminal window to the untrusted device, here, the workstation lap-top. Although the current implementations support secure shell logging into the HSM over the serial console connection, it only provides for secure access over an unsecured network from the administrators perspective; it does not guarantee the work-station laptop or other device the lab operator uses is trusted or authorized for use The lab operator, by way of a user interface or command console on the untrusted lap-top through the serial interface, can then manually program in each IP address for the HSM, and any other related parameters, such as MAC addresses, gateway, masks, Ipv4, subnets and so on. This is a tedious manual process that must be done for each HSM during set-up and possibly later if further initialization is required for the network configuration. This manual configuration process is not easily automated because of company policy based lab restrictions. For example, the DHCP protocol cannot be used. In this process, the HSM relies on default user and roles to the initial setup and control of the HSM. Moreover, the use of a serial port is being deprecated as it adds components costs. Furthermore, it is manually laborious for the lab operator to set-up and configure each HSM unit, for example, finding and identifying the serial port, plugging in the serial cable, connecting and setting up the HSM, reboots, and so on. The complexity increases as some customers request installation and provisioning of many HSMs at once.

To further complicate matters, Data Sovereignty laws in many countries restrict certain data hosting beyond geographical boundaries of the country in question. In almost all cases, this sensitive data is related to payments, Health, Employment, or card Industry.

There are many cloud based HSM related solutions that various vendors provide to customers. In those solutions, although they specify where the actual HSM devices are located, there is no way that a customer can confirm such claim by the cloud based HSM provider. At present, there is no mechanism by which a customer using an HSM over the cloud can determine the location of the HSM device.

All of the subject matter discussed in this Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

SUMMARY

In some embodiments, a system supportive of data residency requirements includes a Hardware Security Module (HSM) hosted on a cloud environment and a location tracker embedded within or directly connected to the HSM to provide an HSM location, the HSM including one or more processors and memory coupled to the one or more processors, where the memory includes computer instructions which when executed by the one or more processors causes the one or more processors to perform certain operations. The operations can include receiving a request for access to information over a network, obtaining authorized location information where the HSM is authorized to process the request from a source of the request for access, comparing the HSM location with the authorized location information from the source, processing the request for access if the HSM location is within the authorized location information and rejecting the request if the HSM location is not within the authorized location information.

In some embodiments, the location tracker embedded within or directly connected to the HSM is a global navigation satellite system (GNSS) module.

In some embodiments, the system further includes computer instructions which causes the one or more processors to obtain the authorized location by generating a user interface in response to the receipt of the request which provides an option for a manual input of a location or locations where the HSM is authorized to process the request as the authorized location information.

In some embodiments, the system further includes computer instructions which causes the one or more processors to obtain authorized location information by receiving a key from the source, wherein the key contains the authorized location information from the source.

In some embodiments, the system further includes computer instructions, which causes the one or more processors to maintain the HSM location hidden from users.

In some embodiments, the system further includes computer instructions, which causes the one or more processors to receive a request to generate a key that can only be used by HSMs in predetermined locations and responding with the transmission of a key that cannot be used with HSMs outside the predetermined locations.

In some embodiments, the system further includes computer instructions, which causes the one or more processors to receive a request to generate a key that can only be used in predetermined countries and responding with the transmission of a key that cannot be used outside the predetermined countries.

In some embodiments, the system further includes computer instructions, which causes the one or more processors to receive a request to generate a key and responding with the transmission of a key that cannot be used outside the country of the HSM location.

In some embodiments, the system further includes computer instructions, which causes the one or more processors to receive a request to process a key containing meta data of the location information where the HSM is authorized and processing the key if the HSM location is within the meta data of the location information where the HSM is authorized.

In some embodiments, the system further includes computer instructions, which causes the one or more processors to securely configure the HSM using a computer or mobile device within a protected environment for programming a secure element by detecting a presence of the secure element in a vicinity of the HSM, authenticating the secure element as a trusted device to the HSM by way of the certificate stored thereon, authenticating a user of the secure element to the HSM, retrieving a set of IP addresses and authorized location information in the secure element associated with an HSM network configuration responsive to authenticating the secure element and authenticating the user, and configuring an initial network state of the HSM for external communication with the set of IP addresses, where the external communication proceeds with an IP address if the HSM location is within the authorized location information associated with the IP address of the set of set of IP addresses.

In some embodiments, the security element is one of: (a) embedded in a smart card having stored thereon a certificate for establishing the smart card as a trusted device, and the presence of the secure element is detected when the smart card is inserted; (b) embedded in a USBC e-Token having stored thereon a certificate for establishing the USBC e-Token as a trusted device, and the presence of the secure element is detected when the USBC e-Token is inserted; or (c) embedded in a Near Field Communication (NFC) chip of a mobile device having stored thereon a certificate for establishing the NFC chip as a trusted device, and the presence of the secure element is detected when the NFC chip is in close proximity to the computer or mobile device.

In some embodiments, a system supportive of data residency requirements can include a plurality of Hardware Security Modules (HSMs) hosted on a cloud environment and a location tracker embedded within or directly connected to the plurality of HSMs in a protected environment to provide an HSM location, the plurality of HSMs including one or more processors and memory coupled to the one or more processors, where the memory includes computer instructions which when executed by the one or more processors causes the one or more processors to perform certain operations. The operations can include receiving a request for access to information over a network at one of the HSMs among the plurality of HSMs, obtaining authorized location information where the HSM is authorized to process the request from a source of the request for access, comparing the HSM location with the authorized location information from the source, processing the request for access if the HSM location is within the authorized location information, and rejecting the request if the HSM location is not within the authorized location information.

In some embodiments, a method supportive of data residency requirements at a Hardware Security Module (HSM) hosted on a cloud environment and further having a location tracker embedded within or directly connected to the HSM to provide an HSM location, the method including the steps of receiving a request for access to information over a network, obtaining or receiving authorized location information where the HSM is authorized to process the request from a source of the request for access, comparing the HSM location with the authorized location information from the source, and processing the request for access only if the HSM location is within the authorized location information.

In some embodiments, the method further includes the step of rejecting the request if the HSM location is not within the authorized location information.

In some embodiments, the method further obtains the authorized location by generating a user interface in response to the receipt of the request which provides an option for a manual input of a location or locations where the HSM is authorized to process the request as the authorized location information.

In some embodiments, the method further obtains the authorized location information by receiving a key from the source, wherein the key contains the authorized location information from the source.

In some embodiments, the method further receives a request to generate a key that can only be used by HSMs in predetermined locations or countries and responding with the transmission of a key that cannot be used with HSMs outside the predetermined locations or countries.

In some embodiments, the method further receives a request to generate a key and responding with the transmission of a key that cannot be used outside the country of the HSM location.

In some embodiments, the HSM in a secure configuring mode by a computer or mobile device in the presence of a secure element performs one of detecting insertion of a smart card embedded with the secure element, detecting insertion of a USBC eToken embedded with the secure element, or detecting a near-field communication chip embedded with the secure element, where a step of authenticating a user of the secure element includes entry of a personal identification number (PIN) or multi-factor authentication (MFA).

In some embodiments, a customer configuration file in the secure element includes a set of unique IP addresses and authorized locations specific to each HSM in a configuration of multiple HSMs in a protected environment, whereby upon detection of the presence of the secure element, each of the multiple HSMs is automatically configured with a respective set of the unique IP addresses and authorized locations.

BRIEF DESCRIPTION OF THE DRAWINGS

The accompanying drawings, which are incorporated in and constitute a part of this description, illustrate embodiments consistent with the embodiments and, together with the description, serve to explain the principles of the embodments.

Figure 1:
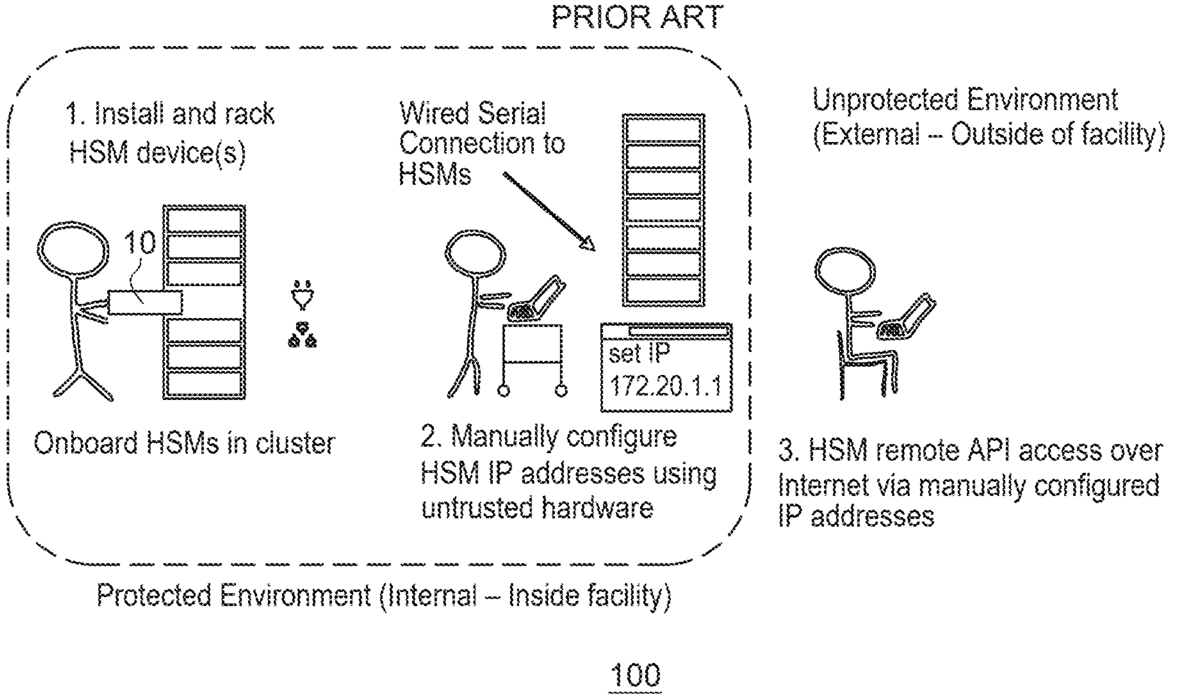
FIG. 1 illustrates an existing work flow for setting up an HSM in a non-secure manner using untrusted devices.

Specific embodiments have been shown by way of example in the foregoing drawings and are hereinafter described in detail. The figures and written description are not intended to limit the scope of the inventive concepts in any manner. Rather, they are provided to illustrate the inventive concepts to a person skilled in the art by reference to particular embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the embodiments. Instead, they are merely examples of apparatuses and methods consistent with aspects related to the embodiments as recited in the appended claims.

In the context of the present description, an HSM is a hardened, tamper-resistant hardware device that secure cryptographic processes by generating, protecting, and managing keys used for encrypting and decrypting data and creating digital signatures and certificates. A "payments HSM" is an HSM for use in financial payments industry. A "hosted HSM" is a payments HSM physically hosted by a computing service provider, for example, within a data center. A "cloud HSM" provides same functionality as on-premises HSMs with the benefits of a cloud service deployment, without the need to host and maintain on premises appliances. A HSM deployment can provide for Software as a Service (SaaS), Platform as a Service (PaaS), or Infrastructure as a Service (IaaS) models.

The "configuring" of a HSM refers to the process/procedure of setting up or changing the parameters of the HSM for its operational or administrative use. It can also refer to the configuring of resources/services offered by the HSM (e.g., network, security, users, data protection, etc.) and associated objects (e.g. keys, data, devices, drivers, etc.). Configuration may be further defined by access rights, permissions of policies and for different users or groups (e.g., administrators, officers, users, etc. The "enforcement" of a configuration refers to confirming to adherence of a quorum policy, for example, to confirm a user has permissions to access, view, update or otherwise interact with a resource, service or object. The manner in which the embodiments limit the use of the HSM dependent on location information is not limited to those disclosed herein. If there is a manner in which location can be used, either by configuring resources, services, associated objects, access rights, permissions, policies or otherwise, such implementations are contemplated herein.

The term "warranting' is the process of establishing manufacturer's trust in the HSM, usually through a software controlled factory installation process. The term "commissioning" is the process of changing from using the preplaced HSM manufacturer's trust to the customer's trust by the end-user, usually within an environment controlled by a service provider. The term "provisioning" of a HSM refers to the process/procedure of managing the allocation of the hosted HSM allocation to a particular end-user. A third party "service provider" is a vendor providing the HSM, or component thereof, a service associated with the HSM, or selling the HSM as a service (including microservices), and a "customer" is an end-user of the hosted HSM's payment services.

The acronym "IP" designates any protocol of the Internet protocol suite for operation of network applications, such as, for instance: i) in the Application layer of the OSI model: the Hypertext Transfer Protocol (HTTP) or its secure version HTTPS, DHCP, SMTP, TLS/SSL, etc., ii) in the Transport layer of the OSI model which can be used to transmit data over the Internet or any Local Area Network (LAN): the Transmission Control Protocol (TCP), the User Datagram Protocol (UDP) needing only one port for full-duplex, bidirectional traffic, the Stream Control Transmission Protocol (SCTP) and the Datagram Congestion Control Protocol (DCCP) which also use port numbers that match the services of the corresponding TCP or UDP implementation, if they exist; and iii), in the Internet (Network) layer: Internet Protocol (IPv4 or IPv6), ICMP, IGMP, etc.

In described embodiments, there will be considered the non-limiting example of a cloud-based (web-based) payment system architecture, wherein a hosted HSM is housed in a data center and is remotely accessible/configurable by end-users, or operators, through the Internet as a communication network. An operator is a user with administrative privileges for configuring the HSM, for example, a system administrator having their own password and a separate device card, such as a Java Card, for providing additional credentials. Here, a user can also refer to an operator with special privileges above a normal user. It will become apparent to the one with ordinary skills in the art, however, that other public and/or private communication, including for instance a Local Area Network (LAN), can be similarly contemplated.

Figure 2A:
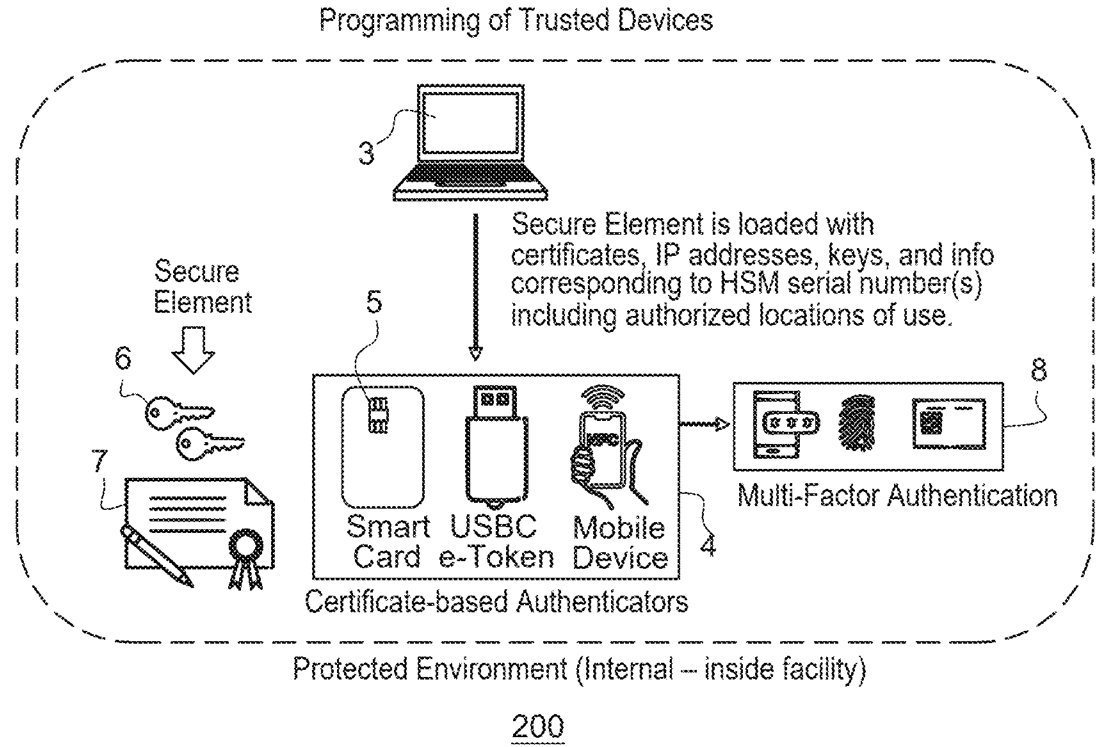
FIG. 2A depicts a protected environment for generating and programming secure element content into a trusted device thereafter used for configuring an HSM in a secure manner in accordance with an embodiment.

FIG. 2A depicts a protected environment for generating and programming secure element content into a trusted device to be used for securely configuring an HSM. The protected environment is the lab facility where one or HSMs are racked and stacked. The trusted device is a certificate based authenticator 4 that is one of a smart card, a USBC e-Token, or a mobile device with near field communication (NFC). The certificate based authenticator 4 is a known device over which the organization has control and can assume a certain level of security. Each certificate based authenticator 4 includes a secure element 5 that contains content, for example, keys 6, certificates 7, IP addresses, and/or other information specifically tied to the HSM, such as a serial number and location information or more authorized location information indicating (e.g., what countries, regions, etc.) where the HSM is authorized to process data. Once the secure element content is programmed into the trusted device, it will be used to securely configure the network setup of the HSM and guarantee an end to end trust chain.

The secure element 5 is a tamper resistant chip capable of running secure applications with a certain level of security and features. It is an integrated circuit chip that by design protects its host device from unauthorized access and is used to run a limited set of applications, as well as store confidential and cryptographic data. Here, the secure element 5 is pre-programmed with a multi-application OS that takes advantage of the hardware's memory protection features to ensure that each application's data is only available to itself. Application installation and access is controlled by requiring the use of cryptographic keys for each operation. The secure element 5 contains at least one certificate 7 and one or more keys, for example, an asymmetric key pair 6, comprising a private key within a secure memory of the secure element associated with the corresponding public key of a certificate 7 stored therein.

As shown, the workstation lap-top 3 can be communicatively coupled to the one or more certificate based authenticators 4, each of which can provide multi-factor authentication. MFA is an authentication method that requires the user to provide two or more verification factors to gain access to a resource. With MFA, a user is granted access only after successfully presenting several separate pieces of evidence to an authentication mechanism—usually from at least two of the following three categories: knowledge—something one knows such as a password or personal identification number (PIN), possession—something one has such as a cryptographic identification device, smart card or secure token, and inherence—biometrics such as fingerprints, iris, face, palm print, etc. The goal of MFA is to create a layered defense and make it more difficult for an unauthorized person to access a target such as a physical location, computing device, network or database.

Figure 2B:
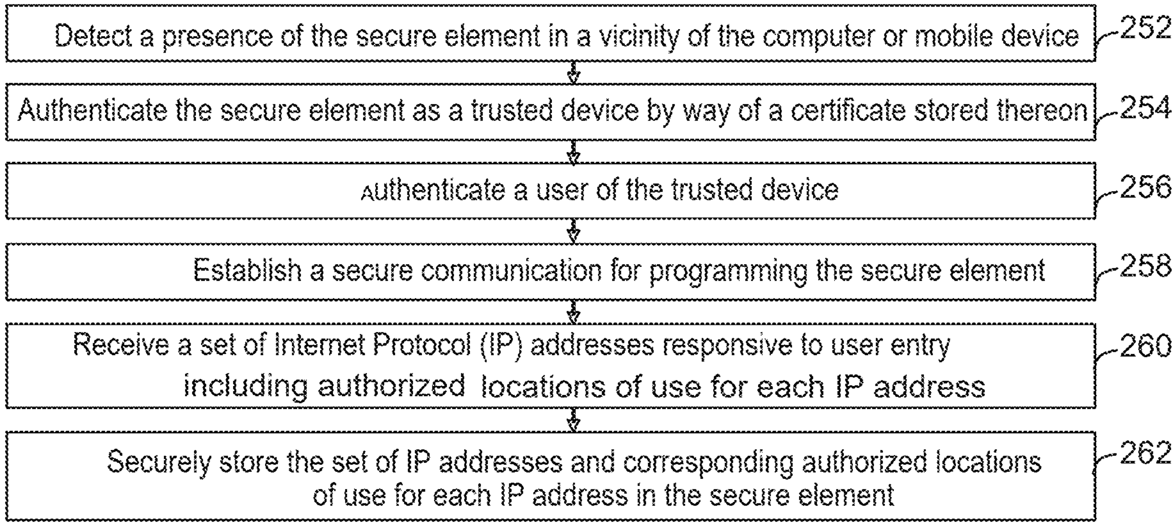
FIG. 2B illustrates methods steps for programming the trusted device in the protected environment of FIG. 2A in accordance with an embodiment.

FIG. 2B illustrates a method 250 for programming a trusted device in the protected environment of FIG. 2A in accordance with an embodiment. The method 250 may include more or less than the number of steps shown and is not limited to only these steps or the order shown. The method 250 is the first part required for generating and programming secure element content into the trusted device; namely, one of the certificate based authenticators 4. Reference will be made to FIG. 2A and the components therein when describing the method 250.

Briefly, the workstation 3 is a computer, or lap-top, comprising one or more processors and memory coupled to the one or more processors, wherein the memory includes computer instructions which when executed by the one or more processors causes the one or more processors to perform the operations of the method steps 252-262. In another embodiment, a mobile phone may serve as the computer workstation for programming the trusted device with secure element content.

At step 252, the workstation 3 detects the presence of the secure element 5. When embedded in a smart card, the presence of the secure element 5 is detected when the smart card is inserted in its card reader port. When embedded in a USBC e-Token, the presence of the secure element 5 is detected when the e-Token is inserted in its USB port. When embedded in an NFC, the presence of the secure element 5 is detected when the NFC is in close proximity to the workstation 3.

At step 254, the workstation 3 authenticates the secure element as a trusted device by way of the certificate 7 stored thereon. It is one-way because the workstation needs only to authenticate the trusted device, which is occurring here in a protected environment. It should also be noted that multiple certificates might be stored in the secure element. For this device authentication step, this particular certificate may have been issued by a private certificate authority, for example, the internal organization or HSM manufacturer. Once authenticated, a secure channel is configured for communications by and between the workstation 3 and trusted device 4.

At step 256, the workstation 3 authenticates the user of the trusted device 4 (e.g. smart card) via the secure element 6. At the most basic level, this can occur when the workstation presents the user with a username and password prompt, and the user thereafter responds with correct credentials/responses (securely stored in, and accessed via the secure element 6). As noted above, a more sophisticated user authentication is contemplated with multi-factor authentication. MFA provides greater assurance that user is really who they are claiming to be, and may include the addition to the user password of a one-time password (OTA), a token, an answer to a security question, or a biometric print, as examples.

Once the trusted device and the user are both authenticated, the workstation 3 establishes a secure communication for programming the trusted device with secure element content, as seen in step 258. These secure communications can be achieved by way of other certificates and keys stored on the certificate based authenticator 4, including SSL/TLS and standard PKI mechanisms for key generation, exchange and session management.

At step 260, the workstation 3 receives a set of Internet Protocol (IP) addresses responsive to user entry thereon for association with a HSM custom network configuration. The set of IP addresses can also include additional information such as meta data that indicates authorized location for use of each IP address. For example, the lab operator, knowing what IP addresses are needed to set up the cluster of HSMs in the protected environment, can type them in manually, or by way of DevOps automations and scripting, has those IP addresses entered into the workstation 3 (included the corresponding authorized locations for use for each IP address), which thereafter programs them into the trusted device (e.g. Smart Card, USBC e-Token, NFC).

At step 262, the workstation 4 securely stores the set of IP addresses (and the corresponding authorized location of use for each IP address) in the secure element 5 of the trusted device. This step further includes generating a customer configuration file 10*a* that includes the set of IP addresses (other HSM specific/relevant data/information such as the corresponding authorized location information for each IP address), signing the customer configuration file with a private key 6 associated with a certificate 7 stored on the secure element 5 thereby producing a signed customer configuration file 10*a*, and storing the signed customer configuration file 10*a* in the secure element 5. In practice, the secure element content (e.g. IP address, serial numbers, etc.) is packaged as a secure app (signed by a private key) only accessible to the secure element, and saved thereon.

Figure 3A:
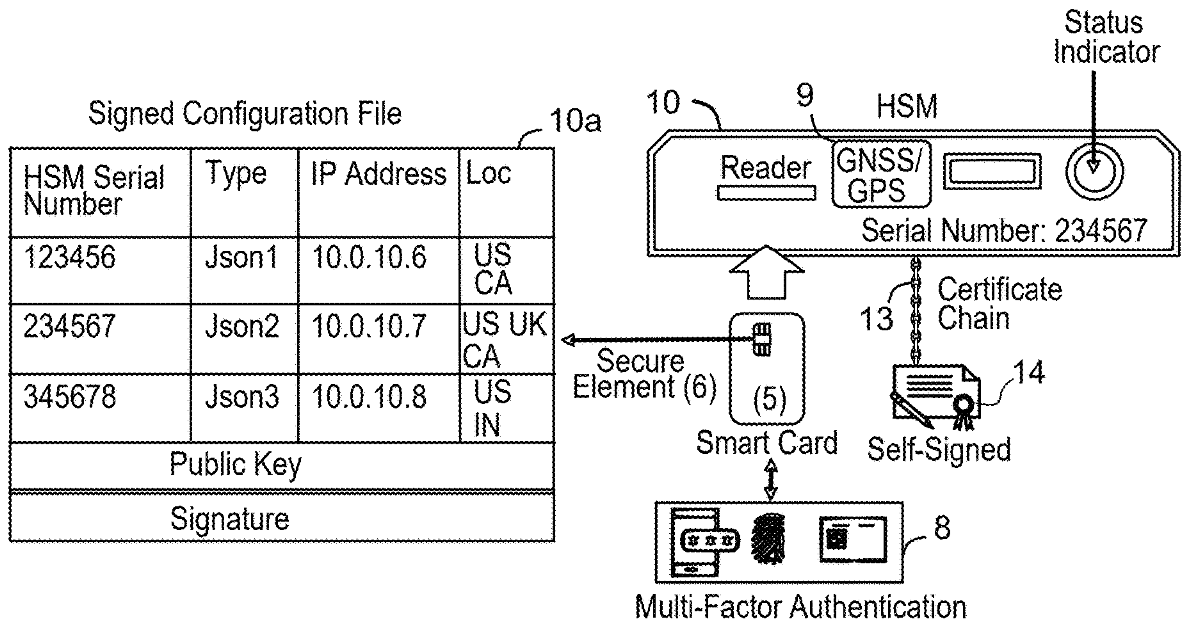
FIG. 3A depicts an environment for onboarding an HSM with trusted devices used to configure the HSM for network communications in a secure manner in accordance with an embodiment.

Briefly, FIG. 3A shows an exemplary signed configuration file 10*a*. This file includes a header section, a body, a public key, and a signature portion. The signature ensures that the HSM knows the secure element content within the file received off the trusted device (here seen as the smart card 5) was signed by the certificate holder. It provides proof of authenticity, data integrity and nonrepudiation of communications and transactions between the HSM and the trusted smart card 5 device. The signed file includes, but is not limited to, the HSM serial number (e.g., 123456), an object format type (e.g. JSON: a standard readable file format used to transmit data between a server and a web application), and the IP address (e.g. 10.0.10.6) to associate with the HSM. Other HSM specific related parameters may be included in the signed configuration script 10*a*, such as MAC addresses, gateway, masks, Ipv4, subnets and so on. In this embodiment, the signed configuration script 10*a* further includes authorized location information corresponding to the HSM Serial Number and/or IP address as shown under the column labeled as “Loc”.

FIG. 3A depicts an environment for onboarding the HSM with trusted devices used to configure the HSM for network communications in a secure manner. Notably, the onboarding effectively occurs after the trusted devices have been programmed with secure element content, as previously described in FIGS. 2A-2B. Certificate-based smart cards with MFA, like that shown in FIG. 3A, offer a single solution for strong authentication and applications access control, including remote access, network access, password management, and logon to the HSM 10. The secure element facilitates the generation and security of public key infrastructure (PKI) keys and certificates that are used to authenticate HSM operating systems and customer applications. This cryptographic module contains the critical public/private keys, which allows a user access on the critical data and infrastructure.

As shown, the HSM 10 retrieves certificates, IP addresses, keys and info from signed configuration (config) file in secure element corresponding to HSM serial number(s) and configures HSM for network communications. Each HSM has its own specific serial number as well as other identifying information (e.g., MAC network card addresses, security processor with unique identifier). The HSM includes a smart card reader (shown), one or more USB ports, and optionally an NFC chip. The HSM 10 can further include a location tracker 9 such as a GNSS tracker that is embedded or otherwise connected to the HSM 10. Internal to the HSM is a trust model, comprising a certificate chain 13 typically ending on a self-signed root certificate 14. The certificates in the chain may be installed at different phases of the HSM manufacturing. For example, programming of a HSM factory image may include installation of one or more factory certificates; programming of a warranting image may include further installation of one or more warrant certificates, and programming of customer images or software upgrades may include installation of a customer certificate. The warrant certificates provide authenticity information about the HSM manufacturer and components therein. The self-signed root certificate is not necessarily signed by a CA-neither private nor public. Here, the certificate is signed with its own private key, securely stored deep in the HSM hardware, instead of requesting it from a public or a private CA. The HSM also provides APIs for generating, importing and exporting certificates and handling code signing requests.

As noted earlier, the HSM 10 includes a local console that is serial connected over e.g., a USB-C interface. However, in the preferred embodiments of the embodiments, the serial interface communication for setting up network communication is replaced by way of the trusted device 5 to automatically configure the IP addresses. Upon detection of the trusted device 5 (here seen as a smart card), the HSM establishes a secure communication with the secure element on the smart card, and then executes the secure app on the smart card containing the customer configured secure element content (e.g. IP addresses, authorized location information, etc.), which then automatically configures the network device components within the HSM. To this point, as shown, the HSM include a colored light status indicator. As example, a white color blinking light means HSM is not connected to any network or not assigned an IP address. A solid green colored light means HSM is connected to a network over an assigned IP address. Understandably, other colors, light patterns and variations are contemplated as a function of the automatic IP address configuration stages, for example, based on time and function (success, failure, user input, progress, power, etc.)

Figure 3B:
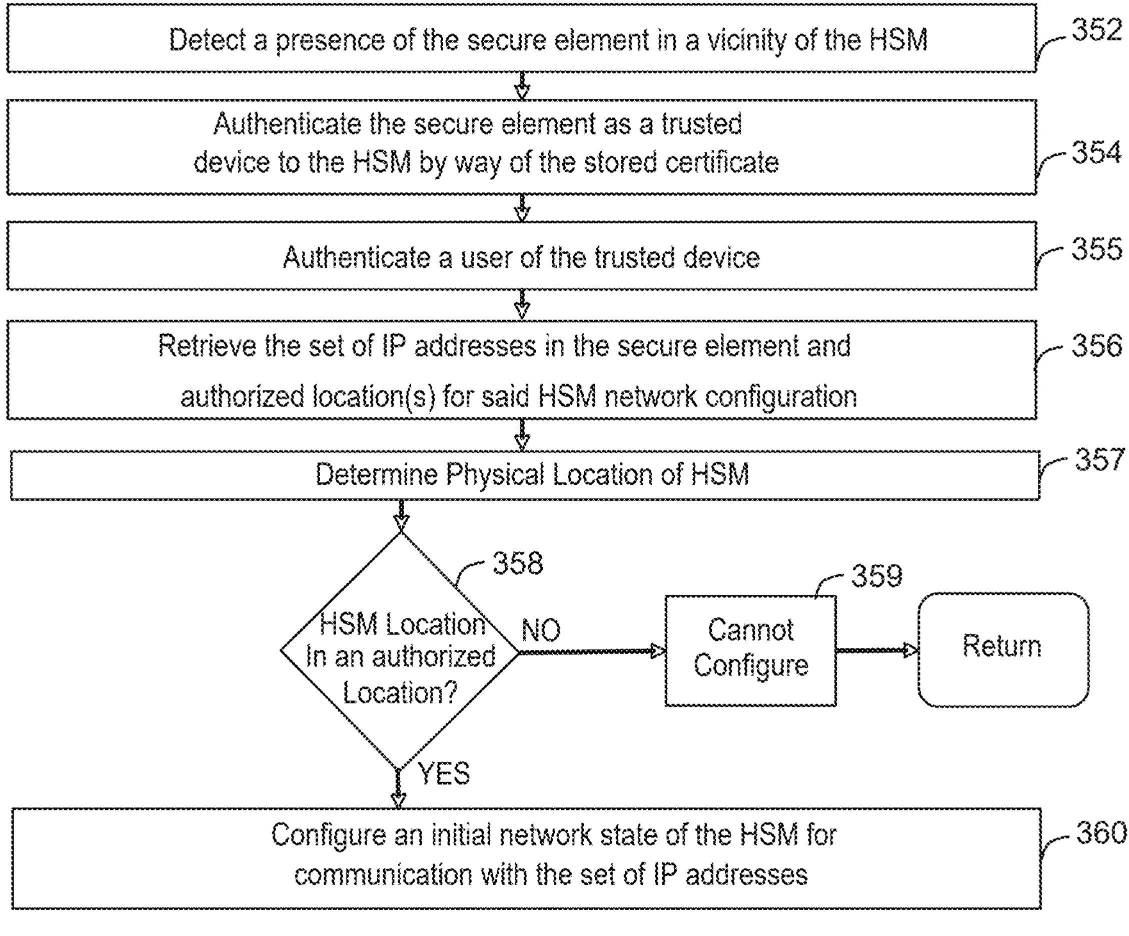
FIG. 3B illustrates methods steps for onboarding an HSM with trusted devices used to configure the HSM for network communications in a secure manner in accordance with an embodiment.

To this point, FIG. 3B illustrates a method 350 for onboarding an HSM with trusted devices used to configure the HSM for network communications in a secure manner in accordance with an embodiment. The method 350 may include more or less than the number of steps shown and is not limited to only these steps or the order shown. The method 350 is the second part required for securely configuring the HSM 10 in a protected onboarding environment initially without prior customer network configuration on that HSM. Reference will be made to FIG. 3A and the components therein when describing the method 350.

The HSM 10 comprises one or more processors and memory coupled to the one or more processors, wherein the memory includes computer instructions which when executed by the one or more processors causes the one or more processors to perform the operations of the method steps. At step 352, the HSM 10 detects a presence of the secure element in a vicinity of the HSM. When embedded in a smart card, the presence of the secure element 5 is detected when the smart card is inserted in its card reader port of the HSM. When embedded in a USBC e-Token, the presence of the secure element 5 is detected when the e-Token is inserted in its USB port of the HSM. When embedded in an NFC, the presence of the secure element 5 is detected when the NFC is in close proximity to the HSM 10. In one arrangement, the step of detecting a presence of the secure element 5 in a vicinity of the HSM 10 occurs automatically upon racking, stacking and onboarding multiple HSMs in the protected environment.

At step 354, the HSM 10 authenticates the secure element 5 as a trusted device to the HSM by way of the certificate 7 stored thereon. It is one-way because the HSM 10 needs only to authenticate the trusted device. In this illustration, the trusted device is the smart card. For the smart card authentication step, this particular certificate may have been issued by the HSM manufacturer. Once authenticated, the HSM creates a secure channel for communication between it and the smart card. This may include SSL/TLS and standard PKI mechanisms for key generation, exchange and session management. The step by the HSM for authenticating the secure element as a trusted device to the HSM by way of the certificate stored thereon, as seen in FIG. 3A, further includes linking certificates through a chain of trust 13 down to a self-signed certificate 14 on the HSM to prove that a particular certificate in the chain originates from a trusted manufacturer source associated with the HSM 10.

At step 355 the HSM 10 authenticates the user of the secure element to the HSM. As previously mentioned in the method 250, user authentication may be performed by way of basic authentication or more sophisticated multi-factor authentication (MFA) approaches. The information to verify and validate the user's identity and information is accessible to the smart card via the secure element.

At step 356, the HSM 10 retrieves the set of IP addresses (and corresponding authorized location information for use of the HSM) in the secure element 5 associated with the HSM custom network configuration responsive to authenticating the secure element and authenticating the user. This step may further include retrieving the signed customer configuration file 110*a* in the secure element 5, validating the signature of the signed customer configuration file with a public key 6 associated with the certificate 7 stored on the secure element 5, and retrieving the set of IP addresses from the signed customer configuration file 10*a*

The method 350 determines the physical location of the HSM ("HSM Location") by extracting the location information from the location tracker or other location determining device such as GNSS tracker 9 shown in FIG. 3A. At decision block 358, the method 350 compares and determines whether the HSM Location is in an authorize location. If the HSM Location is not in an Authorized Location for the HSM at decision block 358, the HSM cannot be configured (359) and the method returns to the start of the onboarding process again.

If the HSM Location is within the Authorized Location(s) for use of the HSM, then the method 350 proceeds to step 360 where the HSM 10 configures an initial network state of the HSM (10) for external communication with the set of IP addresses. As seen in FIG. 3A, the signed customer configuration file 10*a* in the secure element 5 includes a set of unique IP addresses (and corresponding authorize location information) specific to each of the multiple HSMs in the protected environment, whereby upon detection of the presence of the secure element 5, each of the multiple HSMs is automatically configured with a respective set of the unique IP addresses and corresponding authorized location information. Once the HSM 10 is set-up with the IP addresses and other information, it is visible on the network and may be accessed through its standard means, for example, over one or more of its Ethernet ports.

Figure 4:
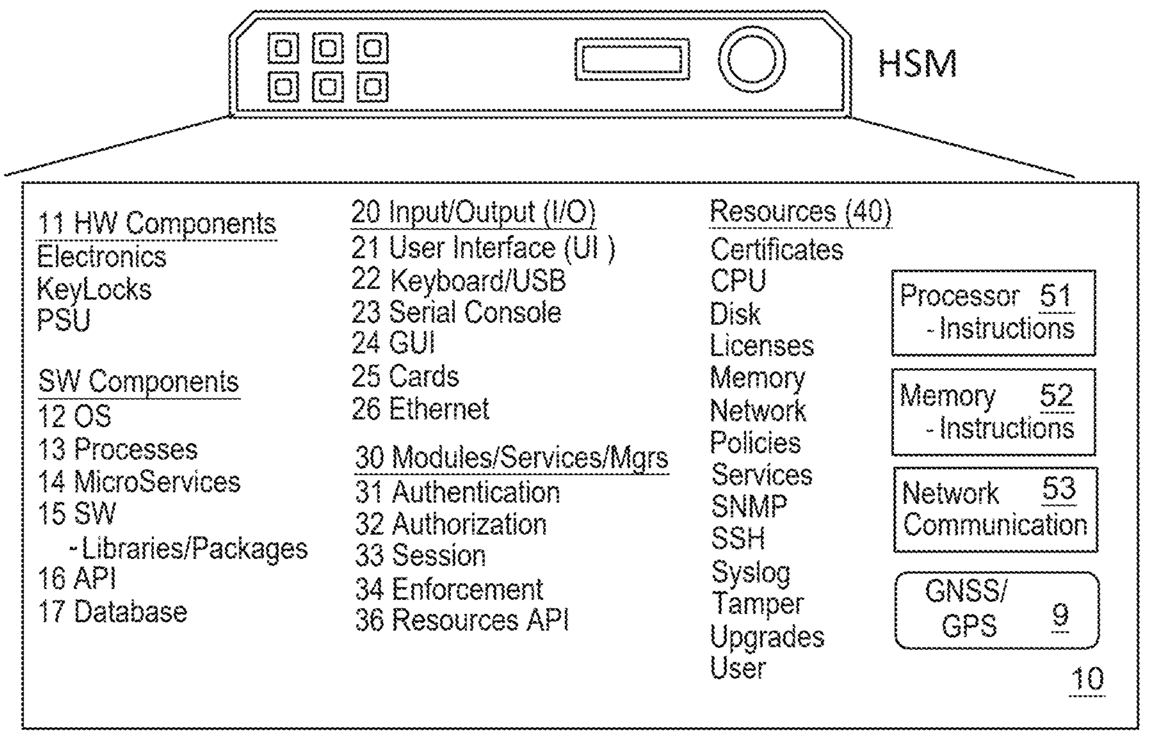
FIG. 4 depicts exemplary components of a Hardware Server Module (HSM) in accordance with one embodiment.

FIG. 4 depicts exemplary components of the Hardware Server Module (HSM) 10. The HSM 10 is a physical computing device that, among other capabilities, safeguards and manages digital keys, performs encryption and decryption functions for digital signatures, and provides for strong authentication and other cryptographic functions. As a security hardened unit, the HSM 10 records tamper evidence, such as visible signs of tampering or logging and alerting, and provides for tamper responsiveness such as deleting keys upon tamper detection. The HSM 10 contains one or more secure cryptoprocessor and sensor chips to prevent tampering and bus probing, or a combination of chips in a module that is protected by the tamper evident, tamper resistant, or tamper responsive packaging.

The HSM 10 is in effect a computer system comprising one or more processors 51 and memory 52 coupled to the one or more processors, wherein the memory 52 includes computer instructions which when executed by the one or more processors causes the one or more processors to perform the operations of the methods described herein. The HSM may be connected over the network to other machines via the network communication device interface 53. In a networked deployment, the machine may operate in the capacity of a server or a client user machine in server-client user network environment, or as a peer machine in a peer-to-peer, or distributed, network environment. The HSM 10 further includes a location tracker 9 such as a GNSS tracking device. Other means of location determining can be employed within the embodiments including cell phone tower triangulation or beacons. Further note that the embodiments are not limited to use of any particular GNSS system, but can use any navigation and positioning system including, but not limited to one or more among positioning systems such as GPS (US), Galileo (owned by Europe), BeiDou/BDS (owned by China), GLONASS (owned by Russia), IRNSS/NavIC (owned by India) or QZSS (owned by Japan). Although used of GPS may be illustrated as an example in some embodiments, the contemplated scope of the claims is not limited to such. Some embodiments can even support multiple Navigation systems at once and hence not rely on any single service in the unlikely event of a system crash or denial of service of one service or another.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the machine-readable memory 52 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

HSM Types

A "general purpose" (GP) HSM is a hardened, tamper-resistant hardware device that strengthen encryption practices by generating keys, encrypting and decrypting data, and creating and verifying digital signatures. GP HSMs may be assembled in clusters and act as a single hardware Root of Trust. It is a critical component of public key infrastructures (PKIs) to generate and protect root and certificate authority keys; code signing to ensure software remains secure, unaltered and authentic; and creating digital certificates for credentialing and authenticating proprietary electronic devices for Internet of Things (IOT) applications and other network deployments. A General Purpose HSM is flexible and can be used in any application that uses cryptographic keys which does not require the additional security controls and regulations imposed by a Payment HSM. Examples include management of the symmetric keys used for database encryption, and management and use of the asymmetric keys used for the creation of digital signatures and certificates to support PKI (Public Key Infrastructure) and crypto wallets.

A "payment" HSM is a hardened, tamper-resistant hardware device that is used primarily by the retail finance or banking industry to provide high levels of protection for cryptographic keys and customer PINs used during the issuance of magnetic stripe and EMV chip cards (and their mobile application equivalents) and the subsequent processing of credit and debit card payment transactions. Payment HSMs normally provide native cryptographic support for all the major card scheme payment applications and undergo rigorous independent hardware certification. Payment HSMs and management tools provide flexible, efficient transaction security for retail payment processing environments, internet payment applications, and web-based PIN delivery.

The main role of a payment HSM is to protect cryptographic keys and other security sensitive data in a highly secure manner, such that the integrity of the overall payment process is maintained, and provide audit and system logs of HSM usage. To that end, HSMs offer the highest level of security by always storing cryptographic keys in intrusion-resistant hardware and providing up to date reporting of its operation. Commonly, HSMs are housed in a data center of a computing resource provider or any similar securely hosting area. More specifically, any HSM hosted in the data center may be attached directly to a server, for instance in a rack, and can be accessed on-site by an operator e.g., through console attach to the HSM via a universal serial bus (USB) connection implementing a USB-C interface, for example.

Other Embodiments

Operational use of the (GP or Payment) HSM 10 for establishing an End to End (E2E) trusted HSM setup using secure device as shown in FIG. 3A is primarily by way of the components shown in the figure, but understandably, many more components, electronics, and modules are present in a typical HSM. Those components shown are those mostly related, and suitable for use, for implementing the foregoing inventive methods. Hardware (HW) components 11 represent general electronics for operating the HSM (e.g., processors, central processing units, security, sensors, memory, network devices, ports, power supply units (PSU), wires, keylocks, etc.). The Hardware also contains memory to run operating system and input-output (I/O) devices for interaction. It comprises different types of processors, such as a crypto processor, security processor, general processing unit (GPU), central processing unit (CPU) to assist in protection, management of keys and hardware acceleration with the operating system. The keys, or any other data, can be stored in the database for persistence. The hardware architecture is designed to protect and manage digital keys, and can perform encryption, decryption, digital signature generation and verification.

In one embodiment, the aforementioned (GP or Payment) HSM 10 functionality and methods for the End to End (E2E) trusted HSM setup using the trusted device 5 is configurable as a micro-service. The customer configuration file is exposed via a micro-services API for End to End (E2E) trusted HSM setup using the trusted device.

Micro-services are independent and lightweight processes designed to perform specific tasks. They are typically handled and managed within the HSM by way of the OS 12. Micro-services 14 can communicate with each other and with external systems over specialized protocols and application programming interface (API) 16. Micro service are built using software libraries/packages 15, which are a self-contained set of independent and interchangeable software component that implement a specific functionality. Micro-services 14 and Processes 13 are built using these software libraries/packages 15. By way of these microservices, applications can implement a third-party Microservice provider's generic API to a service to deliver Payment HSM capabilities. In this manner, for example, a 3$^{rd}$ party customer by way of APIs can partition their workload to optimized payment HSMs for performing specific tasks (e.g. ECC/RSA key gen, PIN translations, etc.) according to their microservice model. As another example, a micro-service with a customer facing API for an End to End (E2E) trusted HSM setup using the trusted device is contemplated. The API can include options allowing the customer to configure trust anchors and certificate chain management for generating and programming the secure content (e.g. IP addresses for network configuration setup) on their workstations and HSM cluster within the protected environment.

The Operating System (OS) 12 is a software component that executes on top of hardware, for example, the general processor, to manage hardware resources and peripherals, run HSM jobs/processes, and help in execution of other processes 13. Ubuntu is an exemplary OS that provides an embedded Linux distribution with libraries and packages. Ubuntu (GNU/Linux) is a multitasking Operating System capable of executing several processes (tasks) simultaneously. Different processes 13 for performing the HSM functions (data protection, key management, pin translations, etc.) are scheduled by the operating system 12. A thread is the basic unit to which the operating system allocates processor time. A process 13 is an instance of a computer program that is executed by one or many threads in the GPU or CPU. One or more threads run in the context of the process. A thread can execute any part of the process code, including parts currently being executed by another thread.

In another embodiment, an API 16 is provided for End to End (E2E) trusted HSM setup using the trusted device 5 when configured as a micro-service. The API can be a RESTful API using HTTP requests to produce and consume data related to network config services via at least one of a GET, PUT, POST, PATCH and DELETE command type. The API includes a command set for each stage of warranting, commissioning, and provisioning the HSM during initial set-up and for life-cycle HSM management, including but not limited to certificate management at each stage.

The Applications Programming Interface (API) 16 provides a connection between computers or between computer programs/applications, and/or between computers and people. It is a type of software interface, offering a service to other pieces of software. The API provides a communication channel between HSM components, internal processes 13 and/or micro services 14. These APIs are exposed on top of input/output (I/O) 20 interfaces. External systems and/or people communicate with HSM via the I/O interfaces 20, such as a basic user interface (UI) 21, or more sophisticated graphical user interface (GUI) 24 The HSM can also communicate with external systems through hardware IO interfaces, such as the keyboard 22, serial port 23, smart card 25, Ethernet 26, optical ports, USB ports, etc. External systems (host computers in a data center) can also talk to HSM software interface via APIs exposed on top of individual hardware interfaces (e.g., network device driver, disk/memory management, etc.).

The HSM 10 includes a local console 23 that is serial connected over e.g., a USB-C interface. The serial interface can be used by operations personnel, namely operators, referred to as DCOps (standing for Data Center Operations), who have physical access to the HSM for manually issuing commands to the HSM. Such USB-C interface is used, for all configuration throughout the HSM service, including initial configuration and cumbersome provisioning processes. The HSM also includes managerial Graphical User Interface (GUI) 24 that over an Ethernet 26 connection allow for remote configuration of the HSM. Also, the I/O 20 can be used to configure network settings, SSH certificates, upgrades, licenses and devices (e.g. CPU, Disk, memory, etc.). Operator (Java) cards 25 also provide a means for provisioning and securing the HSM using key shares and key splits.

The HSM also includes services 30 by way of modules, processes and service managers. Some services may be internal to the HSM, and others may be selectively exposed via the API gateway 16 to external entities or services. Examples of services 30 include authentication 31, authorization 32, session manager 33, enforcement 34, resource API manager 36, and quorum manager 37. Accordingly, service managers can be invoked/managed/configured remotely (external) via their APIs, for example, from a web based GUI (e.g. payShield Manager) via Internet connection over Ethernet to the HSM 10.

The HSM also includes (internal) resources 40 which can be externally configured via the normal I/O interfaces 20, and also, for some, (internally and externally) via any of the module/service managers 30 and their respective APIs. Examples of HSM resources include, but are not limited to, certificates, licenses, policies, device management, services, upgrades and so on. Each resource 40 has a respective API for software modules, processes or microservices to interact with the respective resource. The HSM offers access and services to each resource 40 via the resources API 36. Aside from payments HSM related tasks (e.g. encryption/decryption, key management, etc.), this includes: certificate/license management, SNMP, SSH, memory management/configuration, network management/configuration, upgrade installations/services, user resources, and so on.

The architectural style for APIs is typically categorized as either being SOAP (former acronym for "Simple Object Access Protocol", but referring now to a "Service Oriented Architecture", SOA for Web services) or REST (Representational State Transfer), and both are used to access Web services. While SOAP relies solely on XML to provide messaging services, REST offers a more lightweight method, using URLs in most cases to receive or send information. REST uses different HTTP 1.1 verbs, also known as access "methods" to perform tasks. These methods are GET, POST, PUT, and DELETE, which refers to the reading, updating, creating and deleting of operations concerning objects or resources, respectively. Unlike SOAP, REST does not have to use XML to provide the response. Some REST-based Web services output the data in Command Separated Value (CSV), JavaScript Object Notation (JSON) and Really Simple Syndication (RSS). The advantage with REST is that the output needed can be obtained in a form that is easy to parse within the language of the application specifically concerned.

In the embodiments presented herein, REST offers an alternative to, for instance, SOAP as method of access to a web service. In order to be used in a REST-based application, a web service needs to meet certain constraints. Such a web service is called RESTful. A RESTful web service is required to provide an application access to its web resources in a textual representation and support reading and modification of them with a stateless protocol and a predefined set of operations. By being RESTful, web services provide interoperability between the computer systems on the internet that provide these services. RESTful APIs embody the rules, routines, commands, and protocols that integrate the individual microservices, so they function as a single application. In a RESTful web service, requests made to a resource's URL will elicit a response with a payload formatted in HTML, XML, JSON, or some other format. The response can confirm that some alteration has been made to the resource state, and the response can provide hypertext links to other related resources. When HTTP is used, the operations (HTTP methods) available can comprise: GET, POST, PUT, DELETE, PATCH, and/or OPTIONS.

In some embodiments, the HSM device on cloud is equipped with a GNSS tracker as the part of its hardware. The HSM user interface can be modified to implement the use cases of data sovereignty on the cloud using the output of the GNSS tracker, without disclosing the location of HSM and there-by the location of the Data Center where the HSM is housed.

Figure 5:
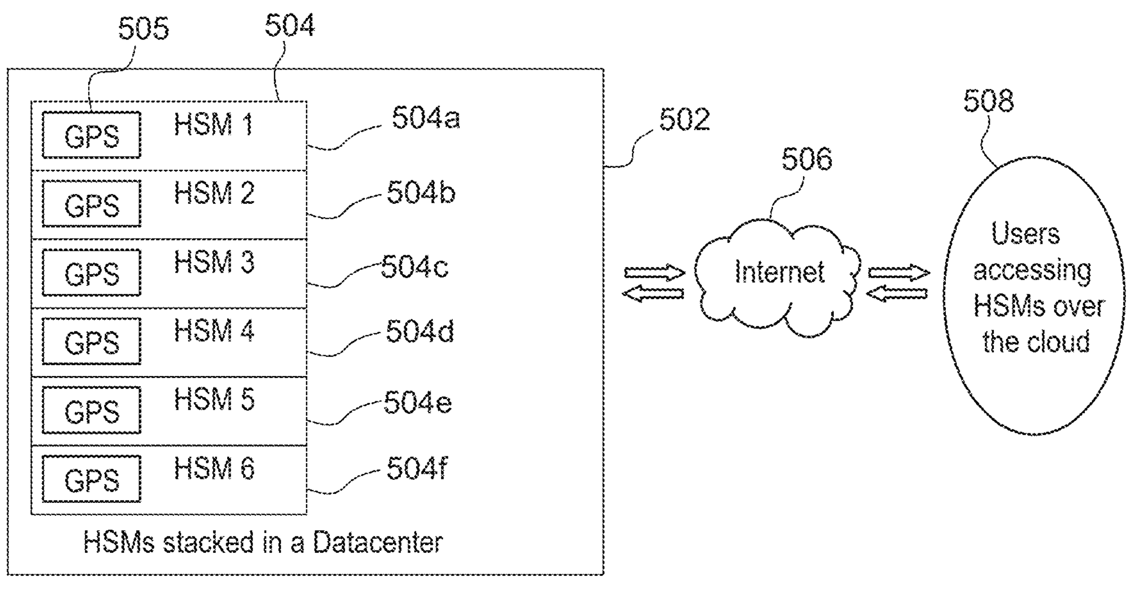
FIG. 5 depicts a system having a plurality of HSMs in a datacenter and corresponding location trackers in accordance with the embodiments.

In some embodiments as illustrated with the system 500 of FIG. 5, such system can include a plurality 504 of HSMs stacked in a datacenter 502 where each HSM 504a-f has its own respective GNSS tracker 505 such as a GPS tracker. A plurality of users 508 can communicate with and access the HSMs 504 via the cloud or Internet 506 as shown. In some embodiments, a system 600 can include just a single HSM 602 having a location or GNSS tracker 604 where a user 608 interacts with the HSM 602 in a secured and authenticated manner to make it functional only for a specific geographical location. Again, as noted above, the embodiments are not limited to use of a particular GNSS tracker or even use of a single particular GNSS tracker. Any combination of navigation and position system can be used including any number of the known GNSS tracker systems (e.g., GPS, Galileo, BeiDou, GLONASS, IRNSS, and/or QZSS, etc.). In some embodiments, using a GNSS system using a multi-frequency position system can help protect HSMs from GPS spoofing attacks.

In a first use case, a user can request processing on the basis of geolocation. The user of the HSM (which is hosted on a cloud) will be able to see an option on a user interface to input the location where the HSM should be to be functional and allowed to process the data. For example, the user can enter a country or list of countries or a region where there may be a data residency requirement for processing such data (see GDPR) or where there maybe data export restrictions and the data must be processed in a home or domestic country.

The HSM then compares the data of the GNSS attached to it, with the input of the user as noted above. If the HSM determines that GNSS data and user input data for location are the same, then the HSM processes the requests, otherwise it rejects them.

Alternatively, a user interface could also provide for an input entering countries or restricted countries where data must not be processed. In this scenario, if the HSM GNSS data is part of the inputted restricted countries list, then the HSM rejects the request and otherwise it will process the request.

Figure 9:
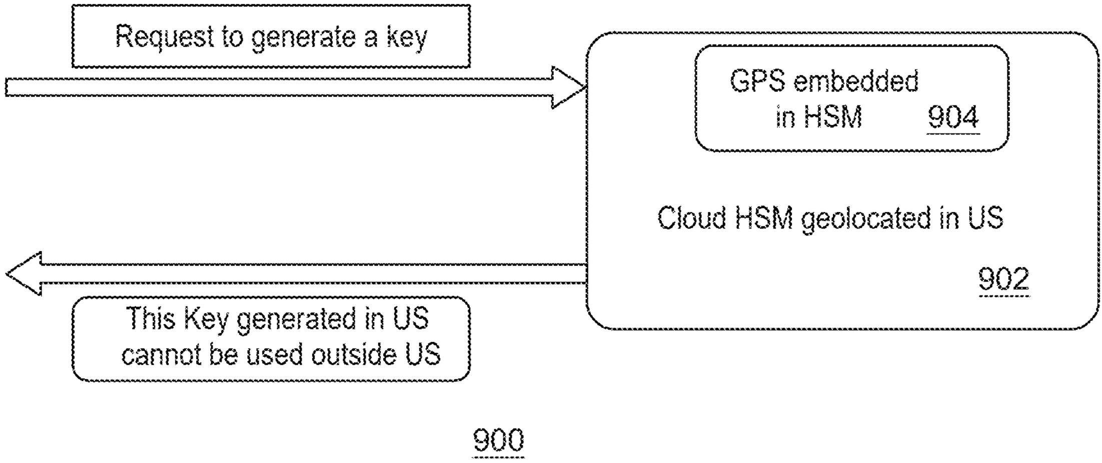
FIG. 9 depicts another system having an HSM and a location tracker where a request to generate a key is received and generated by the HSM in accordance with the embodiments.
Figure 10:
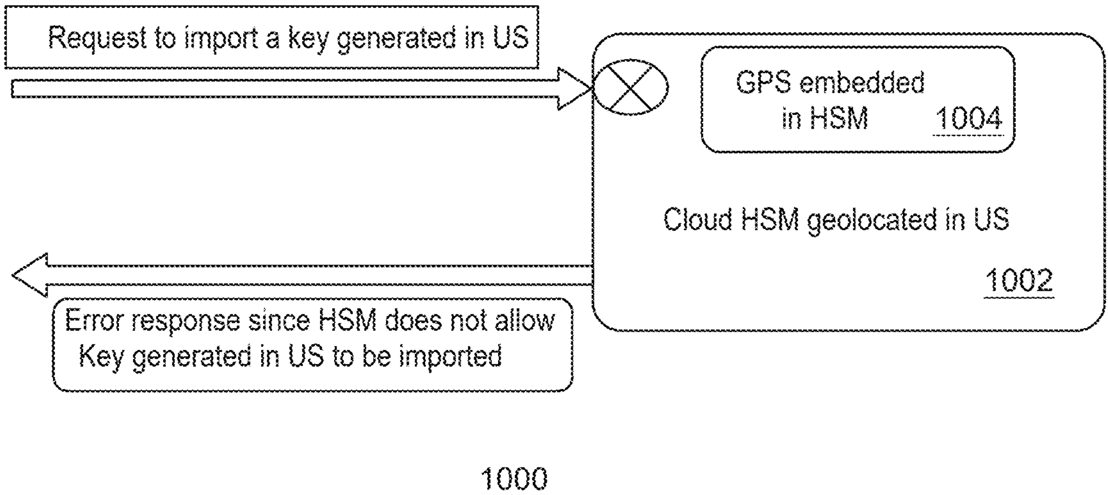
FIG. 10 depicts a system having an HSM and a location tracker where a request to import a key generated in a particular location is received and rejected by the HSM in accordance with the embodiments.

In another example or use case, as shown in the system 900 of FIG. 9 and system 1000 of FIG. 10, if a user of hosted-HSM wants their HSM to be physically located in the US only then, the user enters the US as the expected or designated location of the HSM via a user interface of the HSM. If the HSM 902 is actually located in US as determined by a GNSS tracker 904 embedded at the HSM 902, then it will allow the processing of requests as shown in FIG. 9. Otherwise, it will reject the requests as illustrated by the system 1000 where the HSM 1002 is located outside the designated country as determined by the GNSS tracker 1004. See also system 500 of FIG. 5 and system 600 of FIG. 6.

In another use case, key usage is restricted to support residency laws. The user of the HSM can generate a key that supports residency laws by containing the information of the location where it can be used. See the system 700 with HSM 702 and embedded GNSS 704 (such as GPS) in FIG. 7 where a request is made to generate a key that can only be used in a home country (US), Canada and the UK and the HSM correspondingly generates the key that is made in the US and cannot be used outside of the US, Canada and the UK.

Figure 7:
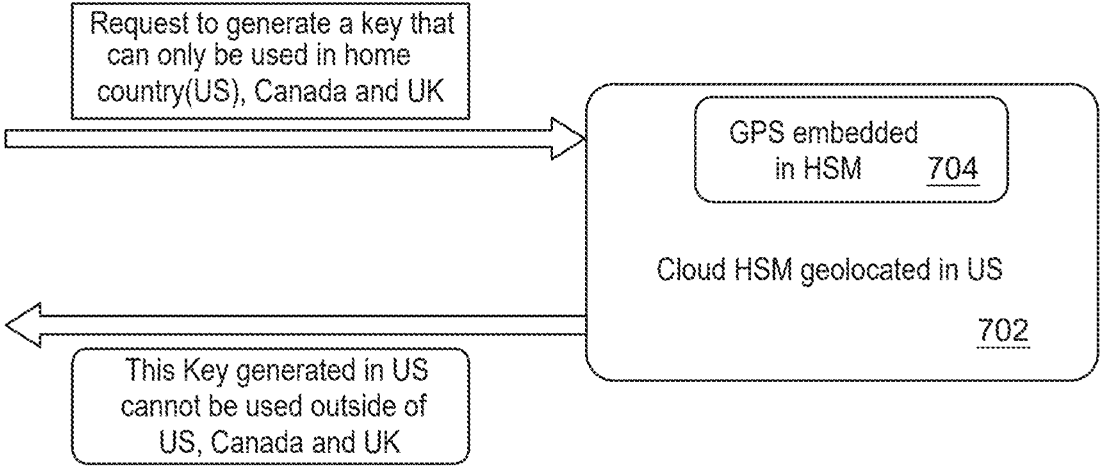
FIG. 7 depicts a system having an HSM and a location tracker where a request to generate a key is received and generated by the HSM in accordance with the embodiments.
Figure 8:
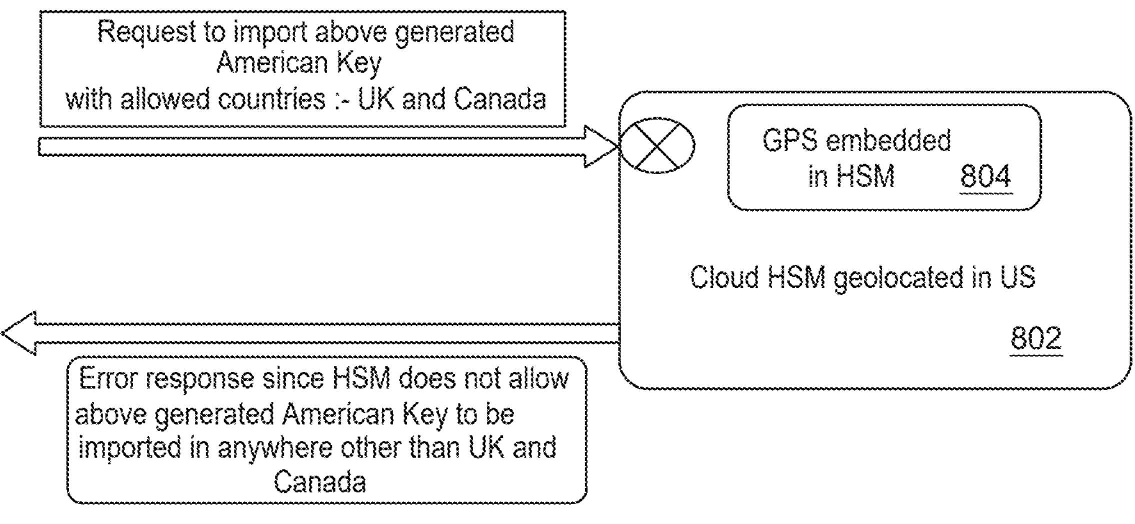
FIG. 8 depicts a system having an HSM and a location tracker where a request to generate a key is received and rejected by the HSM in accordance with the embodiments.

In FIG. 8, a request is made of the HSM 802 in system 800 to import the key (that has country restrictions) generated in the system 700 of FIG. 7. The GNSS 804 embedded in the HSM 802 determines that the HSM 802 is in Russia or not one of the allowed countries specified by the key generated in system 700. Accordingly, the system 800 with HSM 802 and embedded GNSS 804 rejects the request and issues an error response since the HSM does not allow the key (generated in the US) to be imported anywhere other than the UK and Canada.

In yet another example, a key can be generated that contains the information that it can only be used in the US and India. If any Cloud HSM in any other territory tries to process this key, then the respective HSM with GNSS tracker would deny the key usage via the mechanism defined noted above. See again, the system 700 with HSM 702 and embedded GNSS 704 in FIG. 7 and system 800 with HSM 802 and embedded GNSS 804 in FIG. 8.

In yet another example, a system can bind a key with a particular geolocation at the time of key generation. This can further ensure that the key cannot be used at any location other than the bound location.

Figure 11:
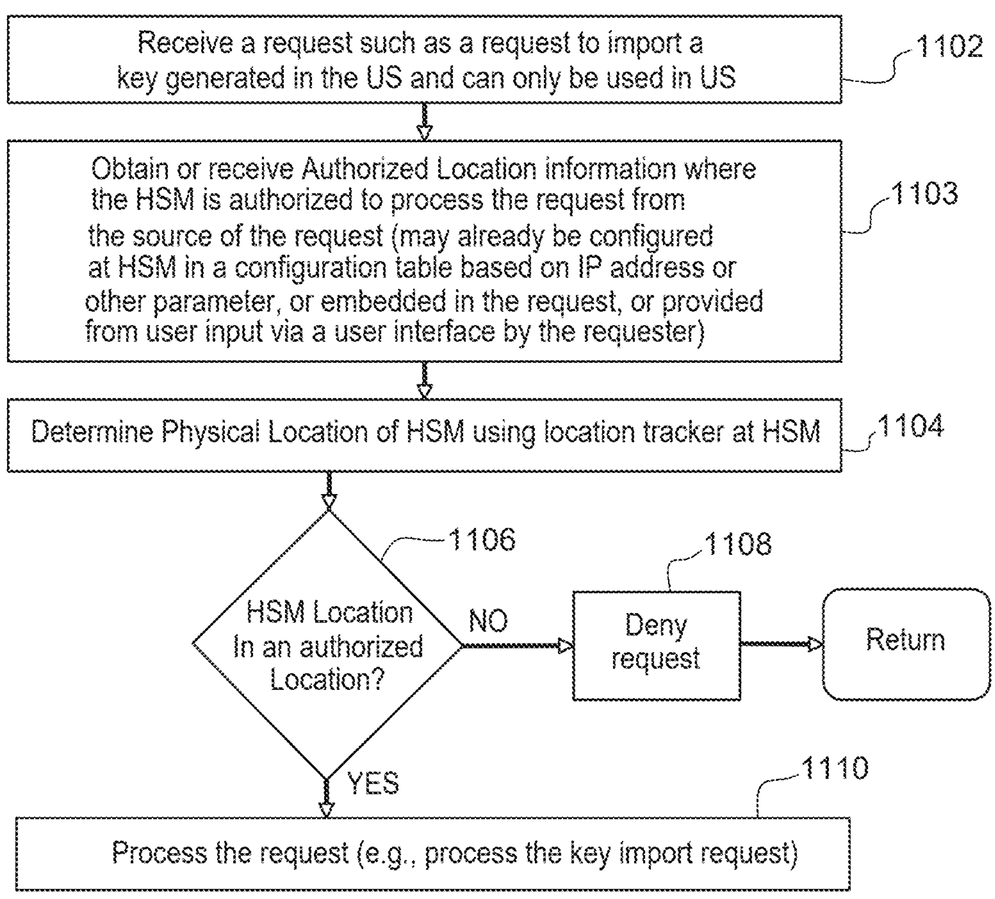
FIG. 11 illustrates a flow chart for a method supporting data residency requirements using an HSM with an embedded GNSS tracker in accordance with the embodiments.

In yet another example, a user can generate a key on an HSM located in US. The HSM generates the key containing the trusted meta data of location. If any Cloud HSM in any other territory tries to process this key as illustrated by step 1102 and 1103 of method 1100 of FIG. 11, then the HSM obtains or receives the Authorized Location Information at 1103 and with GNSS tracker determines the HSM location at step 1104, compares the HSM location with the trusted meta data of location of the key at decision block 1106 and would deny the request at 1108 if the HSM location is not in an authorized location as determined from the key meta data. At step 1110, the key import request would be processed if the HSM location is in an authorized location as determined by comparison (1106) to the key meta data.

Figure 6:
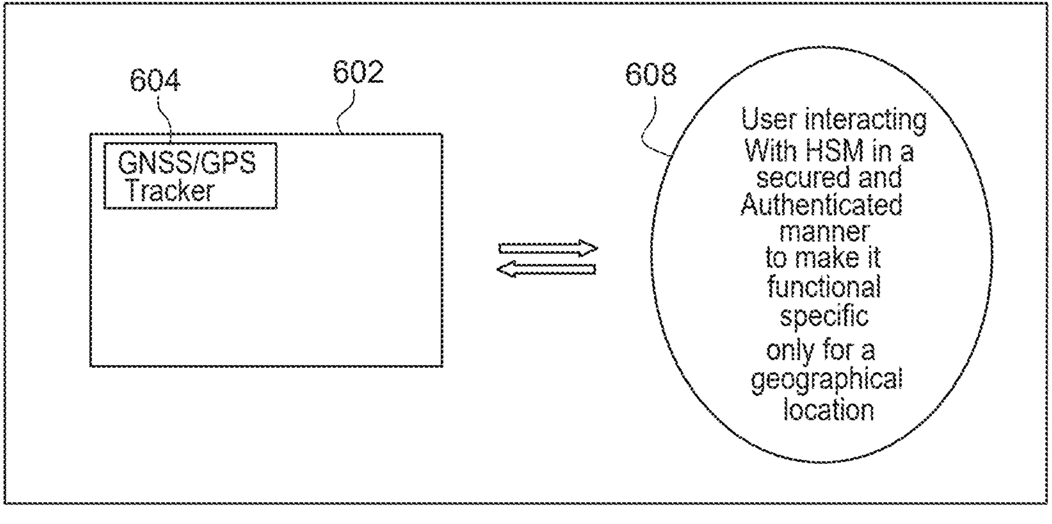
FIG. 6 depicts a system having an HSM and a location tracker in accordance with the embodiments.

In some embodiments as illustrated by a number of figures including FIG.6, a system 600 supportive of data residency requirements includes a Hardware Security Module 602 (HSM) hosted on a cloud environment and a location tracker 604 embedded within or directly connected to the HSM to provide an HSM location, the HSM including one or more processors and memory coupled to the one or more processors, where the memory includes computer instructions which when executed by the one or more processors causes the one or more processors to perform certain operations. The operations can include receiving a request for access to information over a network (such as step 1102 in method 1100 of FIG. 11), obtaining authorized location information where the HSM is authorized to process the request from a source (where the source can be inputted by a user, embedded in a secure element (see secure element 5 in FIG. 2A), embedded in a signed configuration file (see configuration file 10*a* in FIG. 3A) or embedded in a key) of the request for access, comparing the HSM location with the authorized location information from the source (as in decision block 1106), processing the request (at step 1110) for access if the HSM location is within the authorized location information and rejecting (at step 1108) the request if the HSM location is not within the authorized location information.

In some embodiments, the location tracker embedded within or directly connected to the HSM is a global navigation satellite system (GNSS) module.

In some embodiments, the system further includes computer instructions which causes the one or more processors to obtain the authorized location by generating a user interface in response to the receipt of the request which provides an option for a manual input of a location or locations where the HSM is authorized to process the request as the authorized location information.

In some embodiments, the system further includes computer instructions which causes the one or more processors to obtain authorized location information by receiving a key from the source, wherein the key contains the authorized location information from the source.

In some embodiments, the system further includes computer instructions, which causes the one or more processors to maintain the HSM location hidden from users.

In some embodiments as illustrated by FIG. 7, a system 700 further includes computer instructions, which causes the one or more processors to receive a request at the HSM 702 to generate a key that can only be used by HSMs in predetermined locations and responding with the transmission of a key that cannot be used with HSMs outside the predetermined locations.

In some embodiments as illustrated again by FIG. 7, the system 700 further includes computer instructions, which causes the one or more processors to receive a request to generate a key that can only be used in predetermined countries and responding with the transmission of a key that cannot be used outside the predetermined countries.

In some embodiments, the system further includes computer instructions, which causes the one or more processors to receive a request to generate a key and responding with the transmission of a key that cannot be used outside the country of the HSM location as illustrated by an HSM 802 having GNSS tracker 804 in system 800 of FIG. 8.

In some embodiments, the system further includes computer instructions, which causes the one or more processors to receive a request to process a key containing meta data of the location information where the HSM is authorized and processing the key if the HSM location is within the meta data of the location information where the HSM is authorized.

In some embodiments as illustrated by the flow chart 250 of FIG. 2B, the system further includes computer instructions, which causes the one or more processors to securely configure the HSM using a computer or mobile device within a protected environment for programming a secure element by detecting (at 252) a presence of the secure element in a vicinity of the HSM, authenticating (at 254) the secure element as a trusted device to the HSM by way of the certificate stored thereon, authenticating (at 256) a user of the secure element to the HSM (to establish a secure communication for programming the secure element at 258), retrieving (at 260) a set of IP addresses and authorized location information in the secure element associated with an HSM network configuration responsive to authenticating the secure element and authenticating the user, and configuring (at step 262) the secure element with an initial network state of the HSM for external communication with the set of IP addresses for authorized locations, where the external communication proceeds with an IP address if the HSM location is within the authorized location information associated with the IP address of the set of set of IP addresses.

In some embodiments, the security element 5 as shown in FIG. 2A is one of: (a) embedded in a smart card having stored thereon a certificate for establishing the smart card as a trusted device, and the presence of the secure element is detected when the smart card is inserted; (b) embedded in a USBC e-Token having stored thereon a certificate for establishing the USBC e-Token as a trusted device, and the presence of the secure element is detected when the USBC e-Token is inserted; or (c) embedded in a Near Field Communication (NFC) chip of a mobile device having stored thereon a certificate for establishing the NFC chip as a trusted device, and the presence of the secure element is detected when the NFC chip is in close proximity to the computer or mobile device.

In some embodiments as shown in FIG. 5, a system 500 supportive of data residency requirements can include a plurality 504 of Hardware Security Modules (HSMs) (504*a-f*) hosted on a cloud environment 506 and a location tracker 505 embedded within or directly connected to the plurality of HSMs in a protected environment to provide an HSM location, the plurality of HSMs. Note that in some embodiments, a location tracker 505 is embedded in each HSM of the plurality of HSMs. In other embodiments, at least one location tracker 505 is included among the plurality of HSMs. The plurality of HSMs can include one or more processors and memory coupled to the one or more processors, where the memory includes computer instructions which when executed by the one or more processors causes the one or more processors to perform certain operations. The operations can include some of the method previously described such as receiving a request for access to information over a network at one of the HSMs among the plurality of HSMs, obtaining authorized location information where the HSM is authorized to process the request from a source of the request for access, comparing the HSM location with the authorized location information from the source, processing the request for access if the HSM location is within the authorized location information, and rejecting the request if the HSM location is not within the authorized location information.

In some embodiments, the method includes the steps of receiving a request for access to information over a network, obtaining or receiving authorized location information where the HSM is authorized to process the request from a source of the request for access, comparing the HSM location with the authorized location information from the source, and processing the request for access only if the HSM location is within the authorized location information.

In some embodiments, the method further includes the step of rejecting the request if the HSM location is not within the authorized location information.

In some embodiments, the method further obtains the authorized location by generating a user interface in response to the receipt of the request that provides an option for a manual input of a location or locations where the HSM is authorized to process the request as the authorized location information.

In some embodiments, the method further obtains the authorized location information by receiving a key from the source, wherein the key contains the authorized location information from the source.

In some embodiments, the method further receives a request to generate a key that can only be used by HSMs in predetermined locations or countries and responding with the transmission of a key that cannot be used with HSMs outside the predetermined locations or countries.

In some embodiments, the method further receives a request to generate a key and responding with the transmission of a key that cannot be used outside the country of the HSM location.

In some embodiments as illustrated by the system 300 of FIG. 3A, the HSM 10 in a secure configuring mode by a computer or mobile device 3 (see FIG. 2A) in the presence of a secure element 5 performs one of detecting insertion of a smart card embedded with the secure element, detecting insertion of a USBC eToken embedded with the secure element, or detecting a near-field communication chip embedded with the secure element, where a step of authenticating a user of the secure element includes entry of a personal identification number (PIN) or multi-factor authentication (MFA) 8.

In some embodiments, a customer configuration file 10*a* (as shown FIG. 3A) in the secure element 5 includes a set of unique IP addresses and authorized locations specific to each HSM in a configuration of multiple HSMs in a protected environment, whereby upon detection of the presence of the secure element 5, each of the multiple HSMs is automatically configured with a respective set of the unique IP addresses and authorized locations.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed, is:

1. A system supportive of data residency requirements, comprising:

a Hardware Security Module (HSM) hosted on a cloud environment and a location tracker embedded within or directly connected to the HSM to provide an HSM location, the HSM comprising one or more processors and memory coupled to the one or more processors, wherein the memory includes computer instructions which when executed by the one or more processors causes the one or more processors to perform the operations of:

receiving a request for access to information associated with a cryptographic operation using a key over a network;

obtaining authorized location information where the HSM is authorized to process the request by:

retrieving, from a secure element associated the HSM, a signed configuration file comprising a set of IP addresses each associated with authorized location information, configuring the HSM with an IP address from the set only if the HSM location is within the authorized location information associated with the IP address, and receiving or generating the key with location constraints derived from the authorized location information associated with the configured IP address;

comparing the HSM location with the authorized location information including comparing the HSM location with the authorized location information associated with the configured IP address and with the location constraints of the key;

processing the request for access by performing the cryptographic operation using the key only if the HSM location is within the authorized location information and within the location constraints of the key responsive to comparing; and rejecting the request including rejecting the cryptographic operation using the key if the HSM location is not within the authorized location information or not within the location constraints of the key, wherein the location tracker embedded within or directly connected to the HSM is a global navigation satellite system (GNSS) module.

2. The system of claim 1, wherein the system further includes computer instructions which causes the one or more processors to obtain the authorized location by generating a user interface in response to the receipt of the request which provides an option for a manual input of a location or locations where the HSM is authorized to process the request as the authorized location information.

3. The system of claim 1, wherein the system further includes computer instructions which causes the one or more processors to obtain authorized location information by receiving the key from a source of the request for access, wherein the key is signed and contains the authorized location information from the source.

4. The system of claim 1, wherein the system further includes computer instructions, which causes the one or more processors to maintain the HSM location hidden from users.

5. The system of claim 1, wherein the system further includes computer instructions, which causes the one or more processors to receive the request to generate the key that can only be used in predetermined countries or locations and responding with the transmission of the key that cannot be used outside the predetermined countries or locations.

6. The system of claim 1, wherein the system further includes computer instructions, which causes the one or more processors to receive a request to process the key containing meta data of the location information where the HSM is authorized and processing the key if the HSM location is within the meta data of the location information where the HSM is authorized.

7. A method supportive of data residency requirements at a Hardware Security Module (HSM) hosted on a cloud environment and further having a location tracker embedded within or directly connected to the HSM to provide an HSM location, the method comprising:

receiving a request for access to information associated with a cryptographic operation using a key over a network;

obtaining authorized location information where the HSM is authorized to process the request by:

retrieving from a secure element associated the HSM, a signed configuration file comprising a set of IP addresses each associated with authorized location information, configuring the HSM with an IP address from the set only if the HSM location is within the authorized location information associated with the IP address, and receiving or generating the key with location constraints derived from the authorized location information associated with the configured IP address;

comparing the HSM location with the authorized location information including comparing the HSM location with the authorized location information associated with the configured IP address and with the location constraints of the key;

processing the request for access by performing the cryptographic operation using the key only if the HSM location is within the authorized location information and within the location constraints of the key responsive to comparing; and rejecting the request including rejecting the cryptographic operation using the key if the HSM location is not within the authorized location information or not within the location constraints of the key, wherein the location tracker embedded within or directly connected to the HSM is a global navigation satellite system (GNSS) module.

8. The method of claim 7, wherein the method further obtains the authorized location by generating a user interface in response to the receipt of the request that provides an option for a manual input of a location or locations where the HSM is authorized to process the request as the authorized location information.

9. The method of claim 7, wherein the method further obtains the authorized location information by receiving the key from a source of the request for access, wherein the key contains the authorized location information from the source.

10. The method of claim 7, wherein the method further receives a request to generate a key that can only be used by HSMs in predetermined locations or countries and responding with the transmission of a key that cannot be used with HSMs outside the predetermined locations or countries.

11. The method of claim 10, wherein the configuration file in the secure element includes the set of unique IP addresses and authorized locations specific to each HSM in a configuration (504) of multiple HSMs in a protected environment, whereby upon detection of the presence of the secure element, each of the multiple HSMs is automatically configured with a respective set of the unique IP addresses and authorized locations.

12. The method of claim 7, wherein the method further receives a request to generate a key and responding with the transmission of a key that cannot be used outside the country of the HSM location.

* * * * *